US012619830B2

(12) United States Patent
Bi et al.

(10) Patent No.: US 12,619,830 B2
(45) Date of Patent: May 5, 2026

(54) OPTIMIZING PERFORMANCE OF CONVERSATIONAL INTERFACE APPLICATIONS USING EXAMPLE FORGETTING

(71) Applicant: FMR LLC, Boston, MA (US)

(72) Inventors: Chen Bi, Dalian (CN); Ou Li, Dalian (CN); Yong Zou, Dalian (CN); Sijing Lv, Dalian (CN); Bing Cui, Dalian (CN); Tieyi Guo, Frisco, TX (US); Byung Chun, Kingston, MA (US)

(73) Assignee: FMR LLC, Boston, MA (US)

( * ) Notice: Subject to any disclaimer, the term of this patent is extended or adjusted under 35 U.S.C. 154(b) by 190 days.

(21) Appl. No.: 18/649,354

(22) Filed: Apr. 29, 2024

(65) Prior Publication Data

US 2025/0335716 A1      Oct. 30, 2025

(51) Int. Cl.
    *G06F 40/35* (2020.01)
    *G06N 20/00* (2019.01)
(52) U.S. Cl.
    CPC ............. *G06F 40/35* (2020.01); *G06N 20/00* (2019.01)
(58) Field of Classification Search
    None
    See application file for complete search history.

(56) References Cited

U.S. PATENT DOCUMENTS

| | | | |
|---|---|---|---|
| 11,037,549 B1 | 6/2021 | Kulkarni et al. | |
| 11,115,353 B1 | 9/2021 | Crowley et al. | |
| 11,392,773 B1 | 7/2022 | Gangadharaiah et al. | |
| 11,416,777 B2 | 8/2022 | Singaraju et al. | |
| 2020/0142959 A1 | 5/2020 | Mallinar et al. | |
| 2020/0236068 A1* | 7/2020 | TeNyenhuis | G06F 40/35 |
| 2023/0080553 A1 | 3/2023 | Dharmasiri et al. | |
| 2024/0296831 A1* | 9/2024 | Hollander | H04M 3/42221 |
| 2025/0193134 A1* | 6/2025 | R | G06F 40/30 |
| 2025/0203406 A1* | 6/2025 | Zhu | H04W 72/04 |

OTHER PUBLICATIONS

Toneva et al., An Empirical Study of Example Forgetting During Deep Neural Network Learning, 2019, ICLR (Year: 2019).*

(Continued)

*Primary Examiner* — Nafiz E Hoque
(74) *Attorney, Agent, or Firm* — Cesari and McKenna, LLP

(57) ABSTRACT
Methods and apparatuses for optimizing performance of conversational interface applications using example forgetting include a server that retrieves training data comprising utterances each mapped to one or more known intents. The server determines a forgetting count for each utterance and selects utterances from the training data that have a forgetting count above a predetermined threshold. The server identifies whether the predicted intent associated with each utterance is accurate. The server generates updated training data comprising the selected utterances and corresponding predicted intents, and trains conversational interface applications using the updated training data. The server validates performance of the trained conversational interface applications and saves the updated training data.

22 Claims, 5 Drawing Sheets

(56)     References Cited

OTHER PUBLICATIONS

Y. Wu et al., "Google's Neural Machine Translation System: Bridging the Gap between Human and Machine Translation," arXiv:1609.08144v2 [cs.CL], Oct. 8, 2016, available at https://arxiv.org/pdf/1609.08144, 23 pages.

A. Vaswani et al., "Attention Is All You Need," arXiv:1706.03762v7 [cs.CL], Aug. 2, 2023, available at https://arxiv.org/pdf/1706.03762, 15 pages.

J. Devlin et al., "BERT: Pre-training of Deep Bidirectional Transformers for Language Understanding," arXiv:1810.04805v2 [cs.CL], May 24, 2019, available at https://arxiv.org/pdf/1810.04805, 16 pages.

T. Pearce et al., "Understanding Softmax Confidence and Uncertainty," arXiv:2106.04972v1 [cs.LG], Jun. 9, 2021, available at https://arxiv.org/pdf/2106.04972, 37 pages.

Vijayaraghavan V. et al., "Algorithm Inspection for Chatbot Performance Evaluation," 3rd International Conference on Computing and Network Communications (CoCoNet'19), Procedia Computer Science 171 (2020), 2267-2274.

M. Xia et al., "Predicting Performance for Natural Language Processing Tasks," arXiv:2005.00870v1 [cs.CL], May 2, 2020, available at https://arxiv.org/pdf/2005.00870, 22 pages.

* cited by examiner

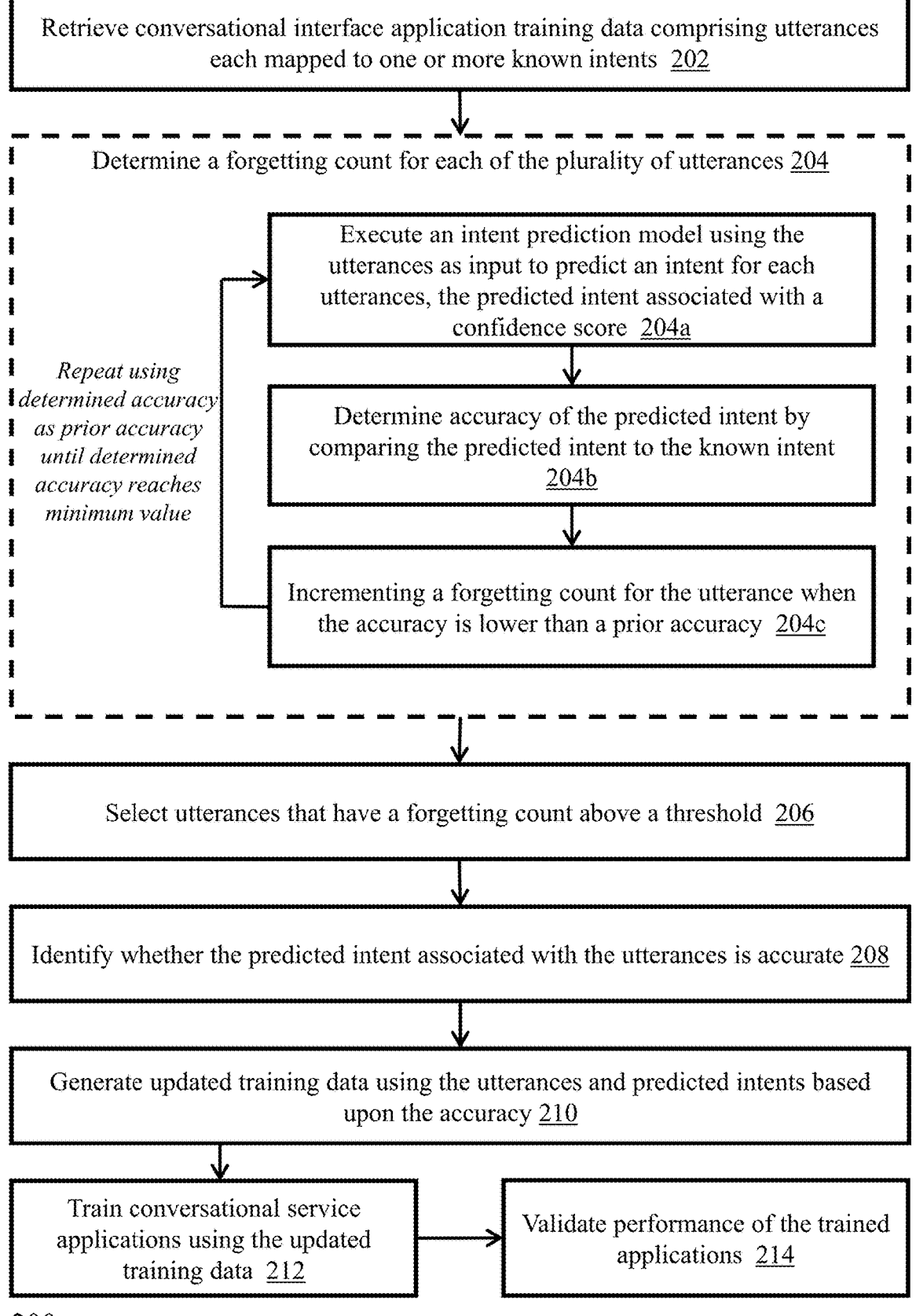

Retrieve conversational interface application training data comprising utterances each mapped to one or more known intents 202

Determine a forgetting count for each of the plurality of utterances 204

*Repeat using determined accuracy as prior accuracy until determined accuracy reaches minimum value*

Execute an intent prediction model using the utterances as input to predict an intent for each utterances, the predicted intent associated with a confidence score 204a Determine accuracy of the predicted intent by comparing the predicted intent to the known intent 204b Incrementing a forgetting count for the utterance when the accuracy is lower than a prior accuracy 204c Select utterances that have a forgetting count above a threshold 206

Identify whether the predicted intent associated with the utterances is accurate 208

Generate updated training data using the utterances and predicted intents based upon the accuracy 210

Train conversational service applications using the updated training data 212

Validate performance of the trained applications 214

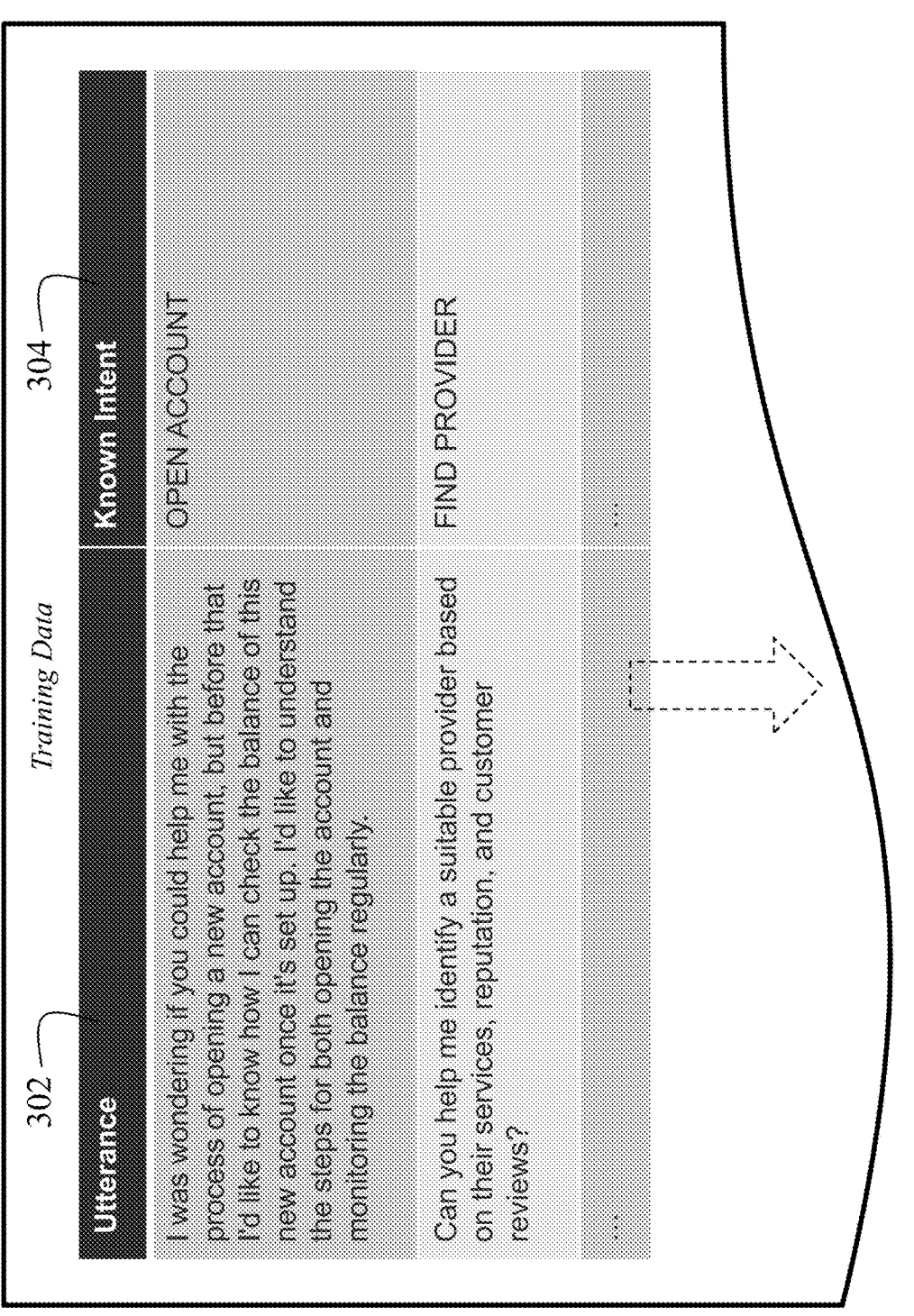

| Utterance | Known Intent |
|-----------|--------------|
| *Training Data* 302 | 304 |
| I was wondering if you could help me with the process of opening a new account, but before that I'd like to know how I can check the balance of this new account once it's set up. I'd like to understand the steps for both opening the account and monitoring the balance regularly. | OPEN ACCOUNT |
| Can you help me identify a suitable provider based on their services, reputation, and customer reviews? | FIND PROVIDER |
| ... | ... |

FIG. 3

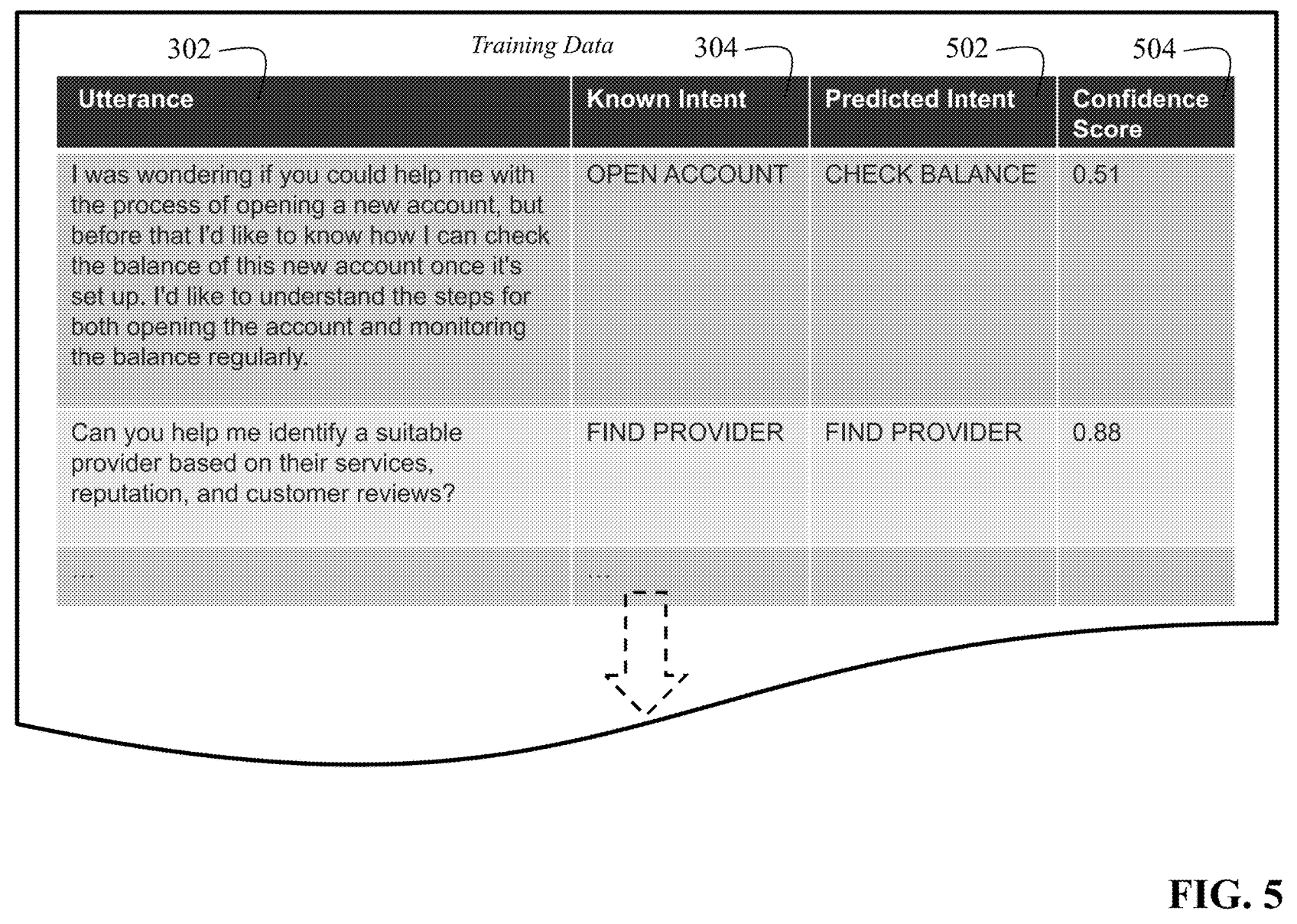

| Utterance 302 | Known Intent 304 | Predicted Intent 502 | Confidence Score 504 |
|---|---|---|---|
| *Training Data* | | | |
| I was wondering if you could help me with the process of opening a new account, but before that I'd like to know how I can check the balance of this new account once it's set up. I'd like to understand the steps for both opening the account and monitoring the balance regularly. | OPEN ACCOUNT | CHECK BALANCE | 0.51 |
| Can you help me identify a suitable provider based on their services, reputation, and customer reviews? | FIND PROVIDER | FIND PROVIDER | 0.88 |

FIG. 5

OPTIMIZING PERFORMANCE OF CONVERSATIONAL INTERFACE APPLICATIONS USING EXAMPLE FORGETTING

TECHNICAL FIELD

This application relates generally to methods and apparatuses, including computer program products, for optimizing performance of conversational interface applications using example forgetting.

BACKGROUND

A virtual assistant application (also called a chatbot) is a computer software application and/or computing system that communicates with users at client computing devices through an exchange of text messages and/or audio messages during conversations. Virtual assistants are commonly used in different areas of daily life with high efficiency and low costs, such as providing weather forecasts, giving business advice, and responding to queries. Generally, the technology behind a virtual assistant application comprises a Natural Language Understanding (NLU) and/or Natural Language Processing (NLP) algorithm that captures user input messages (also called utterances), parses the messages, and attempts to discern the intent or reason for the user's messages. Certain types of virtual assistants are task-oriented, meaning that the virtual assistant receives a user message, recognizes one or more user intents and/or entities of the message, retrieves information that is related to or otherwise responsive to the message, and generates a response message that is provided to the user. In some cases, virtual assistant applications leverage advanced machine learning technology—such as intent recognition models—in order to comprehend the intent behind a user's message more accurately or efficiently. Generally, an intent recognition model attempts to map a user's message to a particular user intent that is defined in the virtual assistant, where the intent provides the virtual assistant with a starting point from which to respond to the user message.

Although a virtual assistant can be highly useful for business owners (e.g., by reducing or eliminating the need for live customer service staff, more quickly responding to user queries, etc.), sometimes the virtual assistant may be unable to determine the proper user intent or may determine an incorrect user intent because, e.g., the chatbot may be unable to parse or understand a particular message from an end user (a so-called unrecognized or incomprehensible message). For example, when a chatbot does not comprehend a user's message, the chatbot may simply respond with a default message such as "Sorry, I don't understand what you mean by that," continually asks the user to repeat the message or state the message in a different way, or the virtual assistant may provide a response to the user that includes irrelevant or incorrect information. As a result, some end users may stop interacting with virtual assistant systems due to experiencing these difficulties with the virtual assistant understanding the user's messages and providing unexpected or undesirable responses. Such activity leads to user dissatisfaction with the virtual assistant technology.

To avoid these problems, developers try to improve the virtual assistant application performance by re-training the underlying intent recognition model so that the model better understands the intent behind the requests/messages originating from end users. As can be appreciated, upon closer inspection, certain messages should actually be mapped to different user intents than they are currently, while other messages should be mapped to new user intents. When correct intent mappings are determined for user utterances, the data can be absorbed into the model training dataset to help re-train and improve the existing intent classifier model.

In some circumstances, the creation and validation of training data (e.g., a corpus of utterances and known intents) for virtual assistant NLP/NLU models is difficult and time-consuming. In addition, certain utterances in the training data may not contribute to improving the accuracy and robustness of the NLP/NLU models because the models may consistently make accurate intent predictions for those utterances.

SUMMARY

Therefore, what is needed are methods and systems for automatically generating useful and relevant training data for NLP/NLU intent prediction models in conversation service applications that can improve the accuracy and responsiveness of those applications. The techniques described herein advantageously analyze existing intent prediction model training data using a framework of example forgetting in order to identify portions of training data that can be used to re-train intent prediction models and lead to meaningful improvement. Additional benefits realized by the methods and systems described herein include understanding the impact of each training utterance on the performance of the intent prediction model, which helps guide the chatbot designer in ways to update training data at the intent level which positively impacts the prediction determinations of the intent prediction model during both training and testing. Furthermore, the technology described herein reduces the amount of time that chatbot designers need to spend updating training utterances, re-training the intent prediction model, and validating the training data—which reduces the time lag between training/testing and deployment of the model.

The invention, in one aspect, features a computer system for optimizing performance of conversational interface applications using example forgetting. The system includes a server computing device having a memory that stores computer-executable instructions and a processor that executes the computer-executable instructions. The server computing device retrieves a corpus of conversational interface application training data from a data store, the conversational interface application training data comprising a plurality of utterances each mapped to one or more known intents. The server computing device determines a forgetting count for each of the plurality of utterances, comprising: executing an intent prediction model using the plurality of utterances as input to predict an intent for each of the utterances, the predicted intent associated with a confidence score; determining an accuracy of the predicted intent for each utterance by comparing the predicted intent to the known intent for the utterance; incrementing a forgetting count for each utterance when the determined accuracy of the predicted intent for the utterance is lower than a prior accuracy of the predicted intent for the utterance; and repeating steps a)-c) for each utterance using the determined accuracy as the prior accuracy for the next execution of the intent prediction model. The server computing device selects one or more utterances from the corpus of conversational interface application training data that have a forgetting count above a predetermined threshold value. The server computing device identifies whether the predicted intent associated with each of the selected utterances is accurate based upon (i) word characteristics of the utterance, (ii) semantic meaning of the utterance, and (iii) the confidence score associated with the predicted intent. The server computing device generates an updated corpus of conversational interface application training data comprising one or more of the selected utterances and corresponding predicted intents based upon the accuracy of the predicted intent. The server computing device trains one or more conversational interface applications using the updated corpus of conversational interface application training data. The server computing device validates performance of the trained conversational interface applications and saves the updated corpus of conversational interface application training data in the data store.

The invention, in another aspect, features a computerized method of optimizing performance of conversational interface applications using example forgetting. A server computing device retrieves a corpus of conversational interface application training data from a data store, the conversational interface application training data comprising a plurality of utterances each mapped to one or more known intents. The server computing device determines a forgetting count for each of the plurality of utterances, comprising: executing an intent prediction model using the plurality of utterances as input to predict an intent for each of the utterances, the predicted intent associated with a confidence score; determining an accuracy of the predicted intent for each utterance by comparing the predicted intent to the known intent for the utterance; incrementing a forgetting count for each utterance when the determined accuracy of the predicted intent for the utterance is lower than a prior accuracy of the predicted intent for the utterance; and repeating steps a)-c) for each utterance using the determined accuracy as the prior accuracy for the next execution of the intent prediction model. The server computing device selects one or more utterances from the corpus of conversational interface application training data that have a forgetting count above a predetermined threshold value. The server computing device identifies whether the predicted intent associated with each of the selected utterances is accurate based upon (i) word characteristics of the utterance, (ii) semantic meaning of the utterance, and (iii) the confidence score associated with the predicted intent. The server computing device generates an updated corpus of conversational interface application training data comprising one or more of the selected utterances and corresponding predicted intents based upon the accuracy of the predicted intent. The server computing device trains one or more conversational interface applications using the updated corpus of conversational interface application training data. The server computing device validates performance of the trained conversational interface applications and saves the updated corpus of conversational interface application training data in the data store.

Any of the above aspects can include one or more of the following features. In some embodiments, the intent prediction model comprises a machine learning classification model configured to generate a predicted intent for an input utterance using a supervised learning algorithm. In some embodiments, the intent prediction model is provided by an external conversational interface application platform.

In some embodiments, determining an accuracy of the predicted intent for each utterance comprises comparing the predicted intent to the known intent using a similarity metric and calculating the accuracy of the predicted intent based upon the similarity metric. In some embodiments, the accuracy of the predicted intent for each utterance includes a margin of error. In some embodiments, the accuracy of the predicted intent for each utterance includes a loss function value.

In some embodiments, selecting one or more utterances from the corpus of conversational interface application training data that have a forgetting count above a predetermined threshold value comprises ranking the plurality of utterances using the forgetting count, and selecting one or more utterances based upon the rank assigned to each utterance. In some embodiments, training one or more conversational interface applications using the updated corpus of conversational interface application training data comprises performing a regression test to determine performance characteristics of the conversational interface applications. In some embodiments, validating performance of the trained conversational interface applications comprises comparing the performance characteristics of each conversational service application to historical performance characteristics.

In some embodiments, retrieving a corpus of conversational interface application training data from a data store comprises converting the corpus of conversational interface application training data into a format acceptable as input to the intent prediction model. In some embodiments, the corpus of conversational interface application training data is partitioned into one or more subgroups for processing by the intent classification model.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

FIG. 2 is a flow diagram of a computerized method of optimizing performance of conversational interface applications using example forgetting.

FIG. 3 is a diagram of exemplary utterances and intents in the corpus of conversation interface application training data.

FIG. 5 is a diagram of the corpus of conversation interface application training data with predicted intents and confidence scores as generated by an intent prediction model.

DETAILED DESCRIPTION

Figure 1:
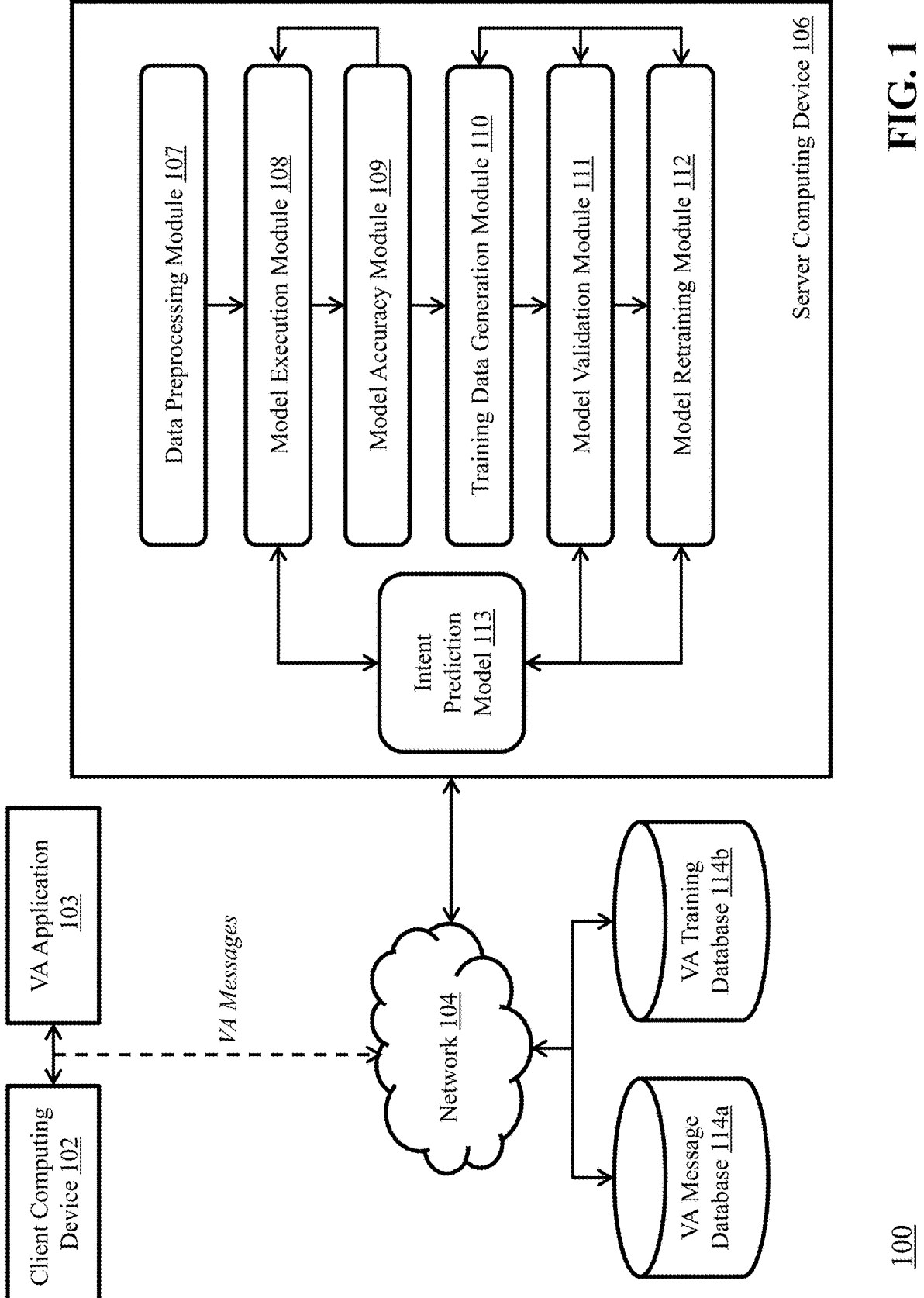
FIG. 1 is a block diagram of a system for optimizing performance of conversational interface applications using example forgetting.

FIG. 1 is a block diagram of system 100 for optimizing performance of conversational interface applications using example forgetting. System 100 includes client computing device 102, virtual assistant (VA) application 103, communication network 104, server computing device 106 that includes data preprocessing module 107, model execution module 108, model accuracy module 109, training data generation module 110, model validation module 111, and model retraining module 112. Server computing device 106 also includes intent prediction model 113. System 100 further includes VA message database 114a and VA training database 114b.

Client computing device 102 connects to communications network 104 in order to establish a chat-based and/or voice-based communication session with VA application 103. Client computing device 102 can be coupled to a display device (not shown), such as a monitor, display panel, or screen. For example, client computing device 102 can provide a graphical user interface (GUI) via the display device to a user of the corresponding device that presents output resulting from the methods and systems described herein and receives input from the user for further processing. Exemplary client computing devices 102 include but are not limited to desktop computers, laptop computers, tablets, mobile devices, smartphones, smart watches, smart speakers, smart displays, Internet-of-Things (IoT) devices, and other Internet appliances. It should be appreciated that other types of client computing devices that are capable of connecting to the components of the system 100 can be used without departing from the scope of invention. Although FIG. 1 depicts a single client computing device 102, it should be appreciated that system 100 can include any number of client computing devices.

VA application 103 (also referred to as a chatbot or conversation interface) comprises an automated conversation service software application executing on a computing device (such as a server computing device) and being configured to automatically interact with a user at client computing device 102 in order to exchange audio or text messages for gathering information and/or responding to inquiries. An exemplary conversation service application can be based upon a natural language processing (NLP) architecture which intelligently parses text or voice messages received from client computing device 102 to understand the intent, semantics and context of the message. VA messages exchanged between client computing device 102 and VA application 103 are stored in VA messages database 112a.

Communication network 104 enables VA messages to be captured from a communication session between client computing device 102 and VA application 103 for storage and processing as described herein. In addition, communication network 104 enables server computing device 106 to communicate with databases 114a and 114b, and one or more other remote computing devices (not shown). In some embodiments, client computing device 102 is similarly connected to network 104 in order to communicate with server computing device 106. Network 104 is typically a wide area network, such as the Internet and/or a cellular network. In some embodiments, network 104 is comprised of several discrete networks and/or sub-networks (e.g., cellular to Internet).

Server computing device 106 is a device including specialized hardware and/or software modules that execute on one or more processors and interact with one or more memory modules of server computing device 106, to receive data from other components of system 100, transmit data to other components of system 100, and perform functions for optimizing performance of conversational interface applications using example forgetting as described herein. Server computing device 106 includes several computing modules (collectively, 107, 108, 109, 110, 111, and 112) that execute on processor(s) of server computing device 106. In some embodiments, modules 107, 108, 109, 110, 111, and 112 are specialized sets of computer software instructions programmed onto one or more dedicated processors in server computing device 106 and can include specifically-designated memory locations and/or registers for executing the specialized computer software instructions.

Although modules 107, 108, 109, 110, 111, and 112 are shown in FIG. 1 as executing within the same server computing device 106, in some embodiments the functionality of modules 107, 108, 109, 110, 111, and 112 can be distributed among a plurality of server computing devices. As shown in FIG. 1, server computing device 106 enables modules 107, 108, 109, 110, 111, and 112 to communicate with each other in order to exchange data for the purpose of performing the described functions. It should be appreciated that any number of computing devices, arranged in a variety of architectures, resources, and configurations (e.g., cluster computing, virtual computing, cloud computing) can be used without departing from the scope of the invention. Exemplary functionality of modules 107, 108, 109, 110, 111, and 112 is described in detail below.

Server computing device 106 also includes intent prediction model 113. Generally, intent prediction model 113 is a machine learning software framework that is configured to analyze representations (e.g., embeddings or vectors) of chat messages exchanged between a user at client computing device 102 and VA application 103 in order to generate a predicted intent of the user during a communication session. Typically, intent prediction model 113 is trained on a corpus of historical VA messages for which the intent is already known or assigned. Based upon this training, intent prediction model 113 is able to receive embeddings for newly-generated chat messages and predict a likely intent of the user by comparing characteristics of the received embeddings to characteristics of embeddings for the historical messages and determining a similarity measure. In some embodiments, intent prediction model 113 is a natural language processing (NLP) and/or natural language understanding (NLU)-based model comprising one or more specialized algorithms (e.g., autoencoders, neural networks, generative models). For example, model 113 can comprise off-the-shelf NLP/NLU processing units or algorithms that may be applicable to a wide range of natural language input but are not specifically trained to recognize user intent from application-specific or context-specific input utterances, and do not comprise application-specific and context-specific responses to the determined intent. Exemplary NLP/NLU models can include, but are not limited to: IBM® Watson™ available from IBM Corp.; Amazon® Lex™ available from Amazon, Inc.; Google® Dialogflow™ available from Google, Inc.; Rasa™ available from; and Microsoft® LUIS™ available from Microsoft Corp. In some embodiments, server computing device 106 accesses model 113 using an external conversational application programming interface (API). Further detail on these types of models is described in A. Abdellatif et al., "A Comparison of Natural Language Understanding Platforms for Chatbots in Software Engineering," arXiv:2012.02640v2 [cs.SE] 22 Jul. 2021, which is incorporated herein by reference. In some embodiments, intent prediction model 113 can comprise a proprietary classification model and response library that is trained on certain organization-specific or business-specific input utterances to generate customized responses. An exemplary intent prediction model 113 can be based on a supervised or semi-supervised learning algorithm, such as support vector machines (SVM), linear regression, logistic regression, Naïve Bayes, Linear Discriminant Analysis (LDA), k-nearest neighbor, neural networks, and others.

In some embodiments, server computing device 106 communicates with VA application 103 (e.g., via API) to interact with an intent prediction model that is used by VA application 103. In these embodiments, intent prediction model 113 may be located in VA application 103. In some embodiments, server computing device 106 imports or otherwise receives intent prediction model 103 from VA application 103 for use by modules 107, 108, 109, 110, 111, and 112. In still other embodiments, server computing device 106 generates intent prediction model 113 using data from VA message database 114a and/or VA training database 114b.

VA message database 114a and VA training database 114b are located on a single computing device (or in some embodiments, on a plurality of computing devices) coupled to client computing device 102 and/or VA application 103, and to server computing device 106, and are configured to receive, generate, transmit, and store specific segments of data relating to the process of optimizing performance of conversational interface applications using example forgetting as described herein. In some embodiments, all or a portion of databases 114a and 114b can be integrated with server computing device 106 or be located on a separate computing device or devices. Databases 114a and 114b can be configured to store portions of data used by the other components of system 100, as will be described in greater detail below. In some embodiments, databases 114a and 114b are located in a cloud storage infrastructure comprising one or more nodes accessible by server computing device 106. Specific aspects of the functions performed by databases 114a and 114b, and the data contained therein, are described throughout the specification.

FIG. 2 is a flow diagram of a computerized method 200 of optimizing performance of conversational interface applications using example forgetting, using system 100 of FIG. 1. As mentioned above, VA message database 112a captures message exchanges between a user of client computing device 102 and VA application 103 during a communication session. VA message database 114a can be configured to capture message exchanges in real-time and/or collect messages asynchronously—for example, at the conclusion of a communication session, VA message database 114a can receive message logs from VA application 103 and store the message logs. In some embodiments, the message logs comprise structured or unstructured data (e.g., text files, XML files) that includes the messages exchanged between the user at client computing device 102 and VA application 103. As can be appreciated, the messages comprise utterances provided by the user and responses provided by VA application 103. In some embodiments, due to privacy concerns, VA application 103 is configured to not collect or store confidential or personally-identifiable information that is exchanged during the communication session—in these embodiments, VA application 103 can redact the sensitive information prior to generating the logs.

As mentioned above, during a communication session with client computing device 102, VA application 103 receives user utterances and parses each user utterance in order to understand the user's intent relating to the utterance and develop an appropriate response to the utterance. Typically, VA application 103 utilizes a trained NLP model and/or trained NLU model to automatically determine user intent. These models are trained on historical communication session data and corresponding user intents assigned by, e.g., analysts to predict user intent for an incoming utterance. As can be appreciated, over time the trained NLP/NLU models need to be periodically re-trained to maintain accuracy and consistency of intent predictions, particularly when the models encounter new utterances or unrecognizable utterances. In this context, a comprehensible (or recognizable) utterance is a user message that the chatbot is able to map to one or more existing user intents while an incomprehensible (or unrecognizable) utterance is a user message that the chatbot cannot map to any existing user intents. Generally, such re-training of NLP/NLU models requires creation of a large amount of training data. However, it is also important that the created training data is useful toward the goal of improving accuracy of the trained NLP/NLU model. For example, training a model with training data which includes utterances considered as 'noisy' and/or anomalous (i.e., does not contribute to improving accuracy of the model) can result in decreased accuracy or lower model confidence in the predictions.

Advantageously, as described herein, modules of server computing device 106 leverage user utterances and determined user intents from communication sessions to automatically optimize the created training data based upon an example forgetting technique to produce a 'golden' training dataset that is stored and subsequently used to re-train NLP/NLU models deployed in VA applications. The modules of server computing device 106 employ advanced machine learning techniques (such as intent prediction/classification, model regression testing) to determine accuracy of intent predictions for utterances as generated by the model and remove utterances that do not contribute to improving the model during training. This enables system 100 to re-train NLP/NLU model(s) used by VA application 103 and seamlessly improve the accuracy and robustness of VA application 103, providing a more consistent and higher-quality user experience.

Turning back to FIG. 2, data preprocessing module 107 retrieves (step 202) a corpus of conversational interface application training data from VA training database 114b. Generally, the corpus of conversation interface application training data comprises a plurality of user utterances from prior communication sessions between client computing devices 102 and VA application 103 as well as a known or determined intent for each utterance as generated by VA application 103. The known intents can also be referred to as labels for the utterance. In some embodiments, the corpus of conversation interface application training data is stored in one or more message logs in database 114b. It should be appreciated that, in some embodiments, module 107 retrieves at least a portion of the training data from message database 114a instead of, or in addition to, database 114b. FIG. 3 is a diagram of exemplary utterances and intents in the corpus of conversation interface application training data. As shown in FIG. 3, utterances (column 302) comprise text strings that correspond to the messages (i.e., chat text and/or spoken messages converted to text via speech recognition algorithm) provided by the user of client computing device 102 during the conversation with VA application 103. Intents (column 304) comprise text strings that correspond to a reason or goal of the user in conducting the conversation as determined from the message.

Data preprocessing module 107 prepares the corpus of training data for ingestion and processing by intent prediction model 113. In some embodiments, module 107 tokenizes each utterance, i.e., partitioning the utterance string into a plurality of tokens. As can be appreciated, each token corresponds to a word in the utterance. In some embodiments, the tokenization process includes the removal from the utterance of stop words, punctuation, blank spaces, symbols, and similar elements that are not relevant to intent prediction. An exemplary tokenization algorithm that can be used by module 107 is Wordpiece, as described in Y. Wu et al., "Google's Neural Machine Translation System: Bridging the Gap between Human and Machine Translation," arXiv:1609.08144v2 [cs.CL] 8 Oct. 2016, available at arxiv.org/pdf/1609.08144.pdf, which is incorporated herein by reference.

System 100 then determines (step 204) a forgetting count for each of the plurality of utterances, using the workflow described below. For each utterance, data preprocessing module 107 utilizes an embedding generation function to convert the corresponding tokens for the utterance into a multidimensional embedding that can be analyzed by intent prediction model 113 to predict user intent. In some embodiments, the embedding generation function of data preprocessing module 107 and the intent prediction model 113 can comprise one or more layers of the same machine learning model. An exemplary model used by module 107 and model 113 can be a pretrained language model such as BERT (Bidirectional Encoder Representations from Transformers), as described in J. Devlin et al., "BERT: Pre-training of Deep Bidirectional Transformers for Language Understanding," *Proceedings of the* 2019 *Conference of the North American Chapter of the Association for Computational Linguistics: Human Language Technologies, Volume* 1 (*Long and Short Papers*), pages 4171-4186, Minneapolis, Minnesota. Association for Computational Linguistics (incorporated herein by reference)). BERT is based upon a Transformer model (as described in A. Vaswani et al., "Attention is all you need," 31$^{st}$ *Conference on Neural Information Processing Systems* (*NIPS* 2017), Long Beach, CA, USA, arXiv:1706.03762v5 [cs.CL] 6 Dec. 2017, available at arxiv.org/pdf/1706.03762, which is incorporated herein by reference). In an exemplary embodiment of modules 108*a* and 108*b*, the BERT model is a fine-tuned BERT classifier comprising twelve (12) layers of Transformer blocks with hidden size of 768 and twelve (12) self-attention heads, and two (2) dense layers with tanh (hyperbolic tangent) activation and one (1) dropout.

In this example, the embedding generation function of module 107 comprises the embedding layer(s) of the BERT model—which can include a token embedding layer, a segment embedding layer, and a position embedding layer. Generally, the token embedding layer converts each token into a multidimensional vector representation of the token—such that the input tokens for a given utterance are converted into a matrix or tensor. The segment embedding layer generates a vector representation for the utterance that is used to distinguish between paired input utterances. The position embeddings layer generates a vector representation for each token based upon the token's position in the utterance. Module 107 sums the vector representations from each of the embedding layers to products a single representation for the utterance that is used by subsequent encoder layers of the BERT model. Additional detail about the embedding layers of the BERT model is described in Devlin, supra.

Figure 4:
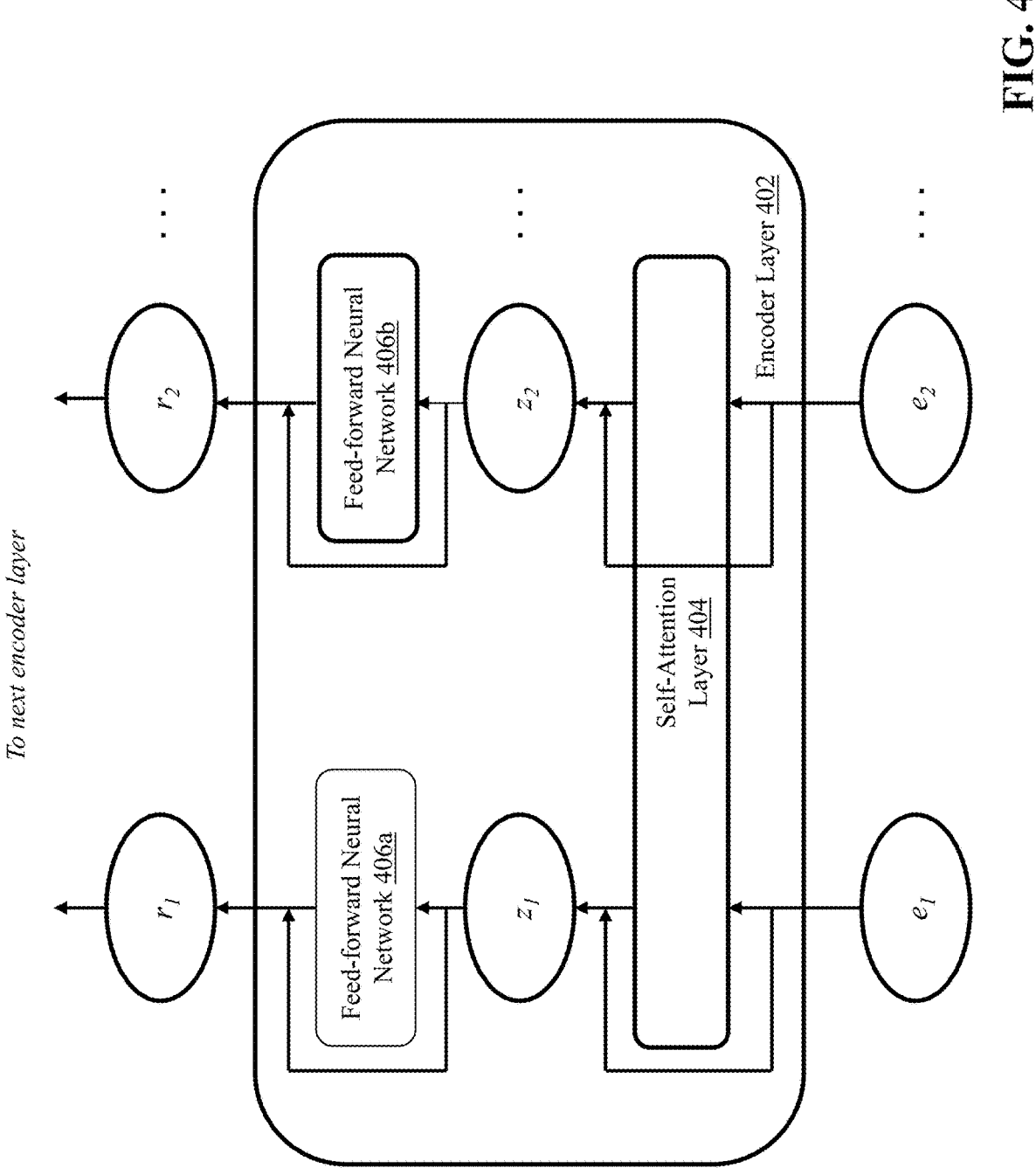
FIG. 4 is a diagram of an exemplary encoder layer of the classifier of an intent prediction model.

Once the input embedding for each utterance in the training data is generated by module 107, model execution module 108 executes (step 204*a*) intent prediction model 113 using the input embeddings to determine a user intent associated with each utterance. In some embodiments, model 113 includes a classifier that comprises the encoder layer(s) of the BERT model, which comprises a stack of six identical layers each with two sub-layers: a multi-head self-attention sub-layer and a feed-forward neural network sub-layer. FIG. 4 is a diagram of an exemplary encoder layer 402 of the classifier of model 113. As shown in FIG. 3, e$_1$, e$_2$, . . . are input embeddings of each token as generated by module 107. Input embeddings are processed through self-attention layer 404 to produce corresponding output z$_1$, z$_2$, . . . (the weighted sum representation of the input token's embedding) based on the following equation:

$$\text{Attention}(Q, K, V) = \text{softmax}\left(\frac{QK^T}{\sqrt{d_k}}\right)V$$

where Q, K, V are calculated by $E{\times}W^Q$, $E{\times}W^K$, $E{\times}W^V$ respectively, E={e$_1$, e$_2$, . . . } is the set of embeddings of all the input tokens, $W^Q$, $W^K$, $W^V$ is the weight matrix that is learned during model training, $Q{\times}K^T$ measures, for each token, when that token is being paid attention to, whether other tokens should be paid more attention or less attention. The softmax function projects the measurements to the values from 0 to 1 as the attention weights. The output z$_1$, z$_2$, . . . for each token is fed into a feed-forward neural network (FFN) (e.g., 406*a*, 406*b*) which produces output r$_1$, r$_2$, . . . , calculated based on the following equation:

$$FFN(x) = \max(0, xW_1 + b_1)W_2 + b_2$$

comprising two linear transformations (xW+b) with a ReLU activation (max (0,*)) in between, which adds a non-linear transformation to enhance the model's representation capability. Output r$_1$, r$_2$, . . . is provided to the next embedding layer in the stack (not shown) and the same processing occurs in each embedding layer. The final output of intent prediction model 113 comprises a predicted intent for each utterance. Model 113 also generates a confidence score associated with each predicted intent. Generally, the confidence score quantifies how confident the model 113 is in the accuracy of its prediction of intent. For example, a lower confidence score may indicate that the model 113 is not confident that the intent predicted for a given utterance is accurate. Conversely, a higher confidence score may indicate that the model 113 is more confident that the intent predicted for a given utterance is accurate. FIG. 5 is a diagram of the corpus of conversation interface application training data with predicted intents 502 and confidence scores 504 as generated by model 113. As shown in FIG. 5, each utterance (column 302 as referenced in FIG. 3) and known intents (column 304 as referenced in FIG. 3) comprise text strings that correspond to an expected reason or goal of the user in conducting the conversation as determined from attributes of the message (including word choice, word placement, semantic meaning, and/or context). Each utterance is also associated with a predicted intent (column 502)—as described above, the predicted intent is the label generated for the utterance by the model 113. Finally, each predicted intent is associated with a confidence score (column 504) that indicates the model's confidence in the accuracy of its prediction. As shown in FIG. 5, the predicted intent 502 for the first utterance in the dataset (CHECK BALANCE) differs from the known intent 304 for that utterance (OPEN ACCOUNT). The confidence score for this prediction is 0.51—indicating that the model 113 is not very confident in the accuracy of the prediction. However, the predicted intent 502 for the second utterance matches the known intent (FIND PROVIDER). The confidence score for this prediction is 0.88—indicating that the model 113 is confident in the accuracy of the prediction.

In some embodiments, the confidence score is the output of the activation function in the model 113—where each score represents the confidence or probability which belongs to a particular class. An exemplary activation function used by the model 113 is softmax, as described in T. Pearce et al., "Understanding Softmax Confidence and Uncertainty," arXiv:2106.04972v1 [cs.LG] 9 Jun. 2021, available at arxiv.org/pdf/2106.04972.pdf, which is incorporated by reference. In some embodiments, the confidence score is not tuned directly; instead different training utterances are generated according to the previous testing result. For example, the utterances "I want to open an account" and "I don't want to open an account" are classified by model 113 as having the intent "open account," but the utterance "my intention is to establish a new account" is not classified by model 113 as having the intent "open account." As a result, model 113 is reinforced to generate more paraphrased utterances that use the phrase "my intention is . . . ", because the model 113 determines that this utterance is forgettable.

Turning back to FIG. 2, once the predicted intent and confidence score for each utterance in the training data is determined by model 113 through execution by model execution module 108, model accuracy module 109 determines (step 204*b*) an accuracy of the predicted intent for each utterance by comparing the predicted intent to the known intent for the utterance. In some embodiments, model accuracy module 109 maintains a binary value for each utterance where a value of 0 indicates the predicted intent for the utterance does not match the known intent (thereby indicating that model 113 incorrectly classified the intent of the utterance) and a value of 1 indicates the predicted intent for the utterance matches the known intent. Model accuracy module 109 also maintains the probability of each intent, calculating loss accuracy and margin based on predicted intent and probability-which can be stored for use in example forgetting calculations and further investigation relating to the training and testing utterances.

Then, using the accuracy determination for the utterance, model accuracy module 109 increments (step 204*c*) a forgetting count for the utterance when the accuracy is lower than a prior accuracy for the utterance. In one example, the forgetting count for each utterance is initialized to zero. After system 100 determines a predicted intent, confidence score, and accuracy value for the intent prediction for each utterance, model accuracy module 109 determines whether to increment the forgetting count for each utterance (i.e., increase the forgetting count by one) based upon the current accuracy value as compared to the prior accuracy value. If the current accuracy value is lower than the prior accuracy value (indicating that model 113 is less confident in the current intent prediction for the given utterance than model 113 was for the prior intent prediction), model accuracy module 109 increases the forgetting count by one. If the current accuracy value is the same as or higher than the prior accuracy value (indicating that model 113 has the same or higher confidence in the current intent prediction for the given utterance than model 113 had for the prior intent prediction), module 109 leaves the forgetting count unchanged. It should be appreciated that, in some embodiments, for each training epoch, module 109 calculates the example forgetting count and increments the total example forgetting count. When module 109 reaches the end of the training dataset, module 109 determines the forgetting count based upon the total example forgetting count for all epochs. For the testing process, module 109 only calculates the example forgetting count once for the testing data.

Then, modules 108 and 109 repeat (step 204*d*) the steps of executing the intent prediction model to predict intents for utterances (step 204*a*), determining an accuracy of the predicted intents (step 204*b*), and incrementing the forgetting count for each utterance (step 204*c*). In some embodiments, modules 108 and 109 employ a stochastic gradient descent (SGD) algorithm to optimize model 113 over multiple executions. Generally, SGD is an optimization process used to find model parameters that correspond to the best fit between model predictions and known outputs. For each execution of steps 204*a*, 204*b* and 204*c*, modules 108 and 109 select a minibatch (e.g., a subset or subgroup) of utterances from the corpus of training data for execution of model 113, computes the gradient of the cost function for model 113 after the execution, and moves the vector of decision variables for model 113 based on the gradient for the next execution of model 113. Then, modules 108 and 109 repeat steps 204*a*, 204*b*, and 204*c* with another minibatch of utterances to compute an updated gradient and move the vector of decision variables for model 113. In some embodiments, modules 108 and 109 select each minibatch of utterances randomly or pseudo-randomly (e.g., using a random number generator function or other similar technique). When the cost function is minimized, modules 108 and 109 determine that model 113 has been optimized and ends the forgetting count determination process of step 204.

In some embodiments, the training process is triggered when a designer wants to improve or optimize bot performance. In this situation, a designer can manually trigger the optimization process described above in step 204 of FIG. 2 and system 100 can generate a report for the designer based on training utterances in a specific epoch as input. In some embodiments, based upon review of the generated report, the designer can decide which training utterances should be used to generate additional training utterances, or eliminate certain training utterances because the utterances are already learned by model 112 (i.e., they are 'unforgettable' utterances). Removal of unforgettable utterances from training data is useful to reduce model size. In addition, there are certain limitations on the amount of training utterances in each intent/category/class for certain providers, such as Amazon® Lex™. As can be appreciated, the the the method 200 of FIG. 2 is iterative, meaning that the designer can repeat the process until they decide that the updated model meets their expectation in both training and testing.

Below is exemplary pseudocode for a software module to generate a forgetting count for each utterance in a minibatch:

```
init prev accuracy(i), accuracy(i) = 0 ,0 i ∈ D
init forgetting count F(i) = 0 i ∈ D
while training do:
    sample_minibatch( )
    for sample I do
        compute_accuracy( )
        if prev accuracy > accuracy:
            F(i) = F(i) + 1
        prev accuracy = accuracy
    Gradient_update( ) classifier
return forgetting count
```

Once modules 108 and 109 have executed model 113 a plurality of times in order to generate a forgetting count for each utterance, training data generation module 110 uses the information generated by modules 108 and 109 to generate updated training data and re-train one or more conversation service applications (i.e., VA application 103) using the updated training data. Module 110 selects (step 206) one or more utterances from the corpus of conversational interface training data that have a forgetting count above a predetermined threshold value. For example, the threshold value can be set to 25 and module can identify utterances that have a forgetting count over the threshold value (which may indicate that the utterances can be automatically filtered out from the training data and/or reviewed by an administrator to determine if the utterances comprise noisy data or anomalous data that needs to be modified). In some embodiments, module 110 is configured to organize or rank the utterances by the forgetting count and generate a report that is transmitted to one or more remote computing devices. The report can be used to notify owners of chatbots and other conversation service applications of potential impact to the applications that may result from changes to the training data (i.e., removing utterances that are considered not to be useful for bot training). In some instances, the owner may decide not to have their model(s) retrained or updated using the modified training data.

For each of the selected utterances, model validation module 111 identifies (step 208) whether the predicted intent associated with the utterance (as generated by model 113) is accurate. In some embodiments, module 109 determines accuracy of the predicted intent for an utterance by estimating a label misinformation score. The label misinformation score estimates the ratio of certain utterance information (i.e., word count, word diversity) to the confidence score generated by model 113. As can be appreciated, a higher label misinformation score indicates that there is rich utterance information from which intent can be determined but for which model 113 has low confidence that the predicted intent is accurate. As an example, model 113 may generate a confidence score of 0.51 for the utterance "I want to withdraw money from IRA account," which means model 113 is not very confident about the current prediction. Therefore, the utterance is treated as potentially mislabeled and can be included in a report for the designer for review of the label information and determination of potential actions for updating the data.

In some embodiments, module 111 determines an accuracy of the predicted intent by comparing the predicted intent to the known intent for the utterance using a similarity metric and calculating the accuracy of the predicted intent based upon the similarity metric. For example, module 111 can compare the predicted intent to the known intent using, e.g., Euclidian distance or cosine similarity to determine accuracy. In some embodiments, the accuracy prediction generated by module 111 includes a margin of error and/or a loss function value—as noted above, minimization of the loss function can indicate higher accuracy.

Using the accuracy value for each utterance, training data generation module 110 generates (step 210) updated training data using the utterances and predicted intents. In some embodiments, module 110 captures one or more of the utterances having an accuracy score that meets or exceeds a minimum accuracy threshold (indicating that model 113 was able to accurately predict the intent for the utterance) and adds the utterances along with the predicted intent values to a corpus of training data. Module 110 can add the utterances and intents to existing training data stored in database 114*b* and/or generate a new corpus of training data.

Model retraining module 112 trains (step 212) one or more conversational service applications (e.g., VA application 103) using the updated corpus of conversation interface application training data generated by training data generation module 110. In some embodiments, model retraining module 112 establishes a connection to VA application 103 and/or another resource that stores the artifacts used to create the NLP/NLU model deployed in VA application 103. Model retraining module 112 retrains the NLP/NLU model using the updated training data and stores the updated model artifacts such that subsequent executions of the NLP/NLU model by VA application 103 can generate intent predictions that reflect the updated training data.

Model validation module 111 then validates (step 214) performance of the trained conversation service applications, such as VA application 103. In some embodiments, model validation module 111 utilizes a cross validation technique to verify the accuracy and robustness of NLP/NLU model performance in VA application 103. Exemplary cross validation algorithms that can be used in module 111 are described in Vijayaraghavan V. et al., "Algorithm Inspection for Chatbot Performance Evaluation," 3$^{rd}$ *International Conference on Computing and Network Performance (Co-CoNet '19)*, Procedia Computer Science 171 (2020), 2267-2274, which is incorporated herein by reference. In some embodiments, model validation module 111 can utilize regression testing to determine performance characteristics of the conversation service applications. Exemplary regression testing techniques are described in M. Xia et al., "Predicting Performance for Natural Language Processing Tasks," arXiv:2005.00870v1 [cs.CL] 2 May 2020, available at arxiv.org/pdf/2005.00870.pdf, which is incorporated herein by reference.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

The computer program can be deployed in a cloud computing environment (e.g., Amazon® AWS, Microsoft® Azure, IBM® Cloud™). A cloud computing environment includes a collection of computing resources provided as a service to one or more remote computing devices that connect to the cloud computing environment via a service account—which allows access to the aforementioned computing resources. Cloud applications use various resources that are distributed within the cloud computing environment, across availability zones, and/or across multiple computing environments or data centers. Cloud applications are hosted as a service and use transitory, temporary, and/or persistent storage to store their data. These applications leverage cloud infrastructure that eliminates the need for continuous monitoring of computing infrastructure by the application developers, such as provisioning servers, clusters, virtual machines, storage devices, and/or network resources. Instead, developers use resources in the cloud computing environment to build and run the application and store relevant data.

Method steps can be performed by one or more processors executing a computer program to perform functions of the invention by operating on input data and/or generating output data. Subroutines can refer to portions of the stored computer program and/or the processor, and/or the special circuitry that implement one or more functions. Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random-access memory or both. The essential elements of a computer are a processor for executing instructions and one or more memory devices for storing instructions and/or data. Exemplary processors can include, but are not limited to, integrated circuit (IC) microprocessors (including single-core and multi-core processors). Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), an ASIC (application-specific integrated circuit), Graphics Processing Unit (GPU) hardware (integrated and/or discrete), another type of specialized processor or processors configured to carry out the method steps, or the like.

Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices (e.g., NAND flash memory, solid state drives (SSD)); magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above-described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). The systems and methods described herein can be configured to interact with a user via wearable computing devices, such as an augmented reality (AR) appliance, a virtual reality (VR) appliance, a mixed reality (MR) appliance, or another type of device. Exemplary wearable computing devices can include, but are not limited to, headsets such as Meta™ Quest 3™ and Apple® Vision Pro™. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above-described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above-described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), a private IP network, an IP private branch exchange (IPBX), a wireless network (e.g., radio access network (RAN), Bluetooth™, near field communications (NFC) network, Wi-Fi™, WiMAX™, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), cellular networks, and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE), cellular (e.g., 4G, 5G), and/or other communication protocols.

Devices of the computing system can include, for example, a computer, a computer with a browser device, a telephone, an IP phone, a mobile device (e.g., cellular phone, personal digital assistant (PDA) device, smartphone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Safari™ from Apple, Inc., Microsoft® Edge® from Microsoft Corporation, and/or Mozilla® Firefox from Mozilla Corporation). Mobile computing devices include, for example, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

The methods and systems described herein can utilize artificial intelligence (AI) and/or machine learning (ML) algorithms to process data and/or control computing devices. In one example, a classification model, is a trained ML algorithm that receives and analyzes input to generate corresponding output, most often a classification and/or label of the input according to a particular framework.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A computer system for optimizing performance of conversational interface applications using example forgetting, the system comprising a server computing device having a memory that stores computer-executable instructions and a processor that executes the computer-executable instructions to:

retrieve a corpus of conversational interface application training data from a data store, the conversational interface application training data comprising a plurality of utterances each mapped to one or more known intents;

determine a forgetting count for each of the plurality of utterances, comprising:

a) executing an intent prediction model using the plurality of utterances as input to predict an intent for each of the utterances, the predicted intent associated with a confidence score;

b) determining an accuracy of the predicted intent for each utterance by comparing the predicted intent to the known intent for the utterance;

c) incrementing a forgetting count for each utterance when the determined accuracy of the predicted intent for the utterance is lower than a prior accuracy of the predicted intent for the utterance, and d) repeating steps a)-c) for each utterance using the determined accuracy as the prior accuracy for the next execution of the intent prediction model until the determined accuracy reaches a minimum value;

select one or more utterances from the corpus of conversational interface application training data that have a forgetting count above a threshold;

identify whether the predicted intent associated with each of the selected utterances is accurate based upon (i) word characteristics of the utterance, (ii) semantic meaning of the utterance, and (iii) the confidence score associated with the predicted intent;

generate an updated corpus of conversational interface application training data comprising one or more of the selected utterances and corresponding predicted intents based upon the identified accuracy;

train one or more conversational interface applications using the updated corpus of conversational interface application training data; and validate performance of the trained conversational interface applications and store the updated corpus of conversational interface application training data in the data store.

2. The system of claim 1, wherein the intent prediction model comprises a machine learning classification model configured to generate a predicted intent for an input utterance using a supervised learning algorithm.

3. The system of claim 2, wherein the intent prediction model is provided by an external conversational interface application platform.

4. The system of claim 1, wherein determining an accuracy of the predicted intent for each utterance comprises comparing the predicted intent to the known intent using a similarity metric and calculating the accuracy of the predicted intent based upon the similarity metric.

5. The system of claim 4, wherein the accuracy of the predicted intent for each utterance includes a margin of error.

6. The system of claim 4, wherein the accuracy of the predicted intent for each utterance includes a loss function value.

7. The system of claim 1, wherein selecting one or more utterances from the corpus of conversational interface application training data that have a forgetting count above a predetermined threshold value comprises:

ranking the plurality of utterances using the forgetting count; and selecting one or more utterances based upon the rank assigned to each utterance.

8. The system of claim 1, wherein training one or more conversational interface applications using the updated corpus of conversational interface application training data comprises performing a regression test to determine performance characteristics of the conversational interface applications.

9. The system of claim 8, wherein validating performance of the trained conversational interface applications comprises comparing the performance characteristics of each conversational service application to historical performance characteristics.

10. The system of claim 1, wherein retrieving a corpus of conversational interface application training data from a data store comprises convert the corpus of conversational interface application training data into a format acceptable as input to the intent prediction model.

11. The system of claim 10, wherein the corpus of conversational interface application training data is partitioned into one or more subgroups for processing by the intent classification model.

12. A computerized method of optimizing performance of conversational interface applications using example forgetting, the system comprising a server computing device having a memory that stores computer-executable instructions and a processor that executes the computer-executable instructions to:

retrieve a corpus of conversational interface application training data from a data store, the conversational interface application training data comprising a plurality of utterances each mapped to one or more known intents;

determine a forgetting count for each of the plurality of utterances, comprising:

a) executing an intent prediction model using the plurality of utterances as input to predict an intent for each of the utterances, the predicted intent associated with a confidence score;

b) determining an accuracy of the predicted intent for each utterance by comparing the predicted intent to the known intent for the utterance;

c) incrementing a forgetting count for each utterance when the determined accuracy of the predicted intent for the utterance is lower than a prior accuracy of the predicted intent for the utterance, and d) repeating steps a)-c) for each utterance using the determined accuracy as the prior accuracy for the next execution of the intent prediction model;

select one or more utterances from the corpus of conversational interface application training data that have a forgetting count above a predetermined threshold value;

identify whether the predicted intent associated with each of the selected utterances is accurate based upon (i) word characteristics of the utterance, (ii) semantic meaning of the utterance, and (iii) the confidence score associated with the predicted intent;

generate an updated corpus of conversational interface application training data comprising one or more of the selected utterances and corresponding predicted intents based upon the accuracy of the predicted intent;

train one or more conversational interface applications using the updated corpus of conversational interface application training data; and validate performance of the trained conversational interface applications and store the updated corpus of conversational interface application training data in the data store.

13. The method of claim 12, wherein the intent prediction model comprises a machine learning classification model configured to generate a predicted intent for an input utterance using a supervised learning algorithm.

14. The method of claim 13, wherein the intent prediction model is provided by an external conversational interface application platform.

15. The method of claim 12, wherein determining an accuracy of the predicted intent for each utterance comprises comparing the predicted intent to the known intent using a similarity metric and calculating the accuracy of the predicted intent based upon the similarity metric.

16. The method of claim 15, wherein the accuracy of the predicted intent for each utterance includes a margin of error.

17. The method of claim 16, wherein the accuracy of the predicted intent for each utterance includes a loss function value.

18. The method of claim 12, wherein selecting one or more utterances from the corpus of conversational interface application training data that have a forgetting count above a predetermined threshold value comprises:

ranking the plurality of utterances using the forgetting count; and selecting one or more utterances based upon the rank assigned to each utterance.

19. The method of claim 12, wherein training one or more conversational interface applications using the updated corpus of conversational interface application training data comprises performing a regression test to determine performance characteristics of the conversational interface applications.

20. The method of claim 19, wherein validating performance of the trained conversational interface applications comprises comparing the performance characteristics of each conversational service application to historical performance characteristics.

21. The method of claim 12, wherein retrieving a corpus of conversational interface application training data from a data store comprises converting the corpus of conversational interface application training data into a format acceptable as input to the intent prediction model.

22. The method of claim 21, wherein the corpus of conversational interface application training data is partitioned into one or more subgroups for processing by the intent classification model.

* * * * *